J. H. SPENCER.
BREAKING OR GRANULATING MACHINE.
APPLICATION FILED AUG. 6, 1909.
946,283.
Patented Jan. 11, 1910.
2 SHEETS—SHEET 1.
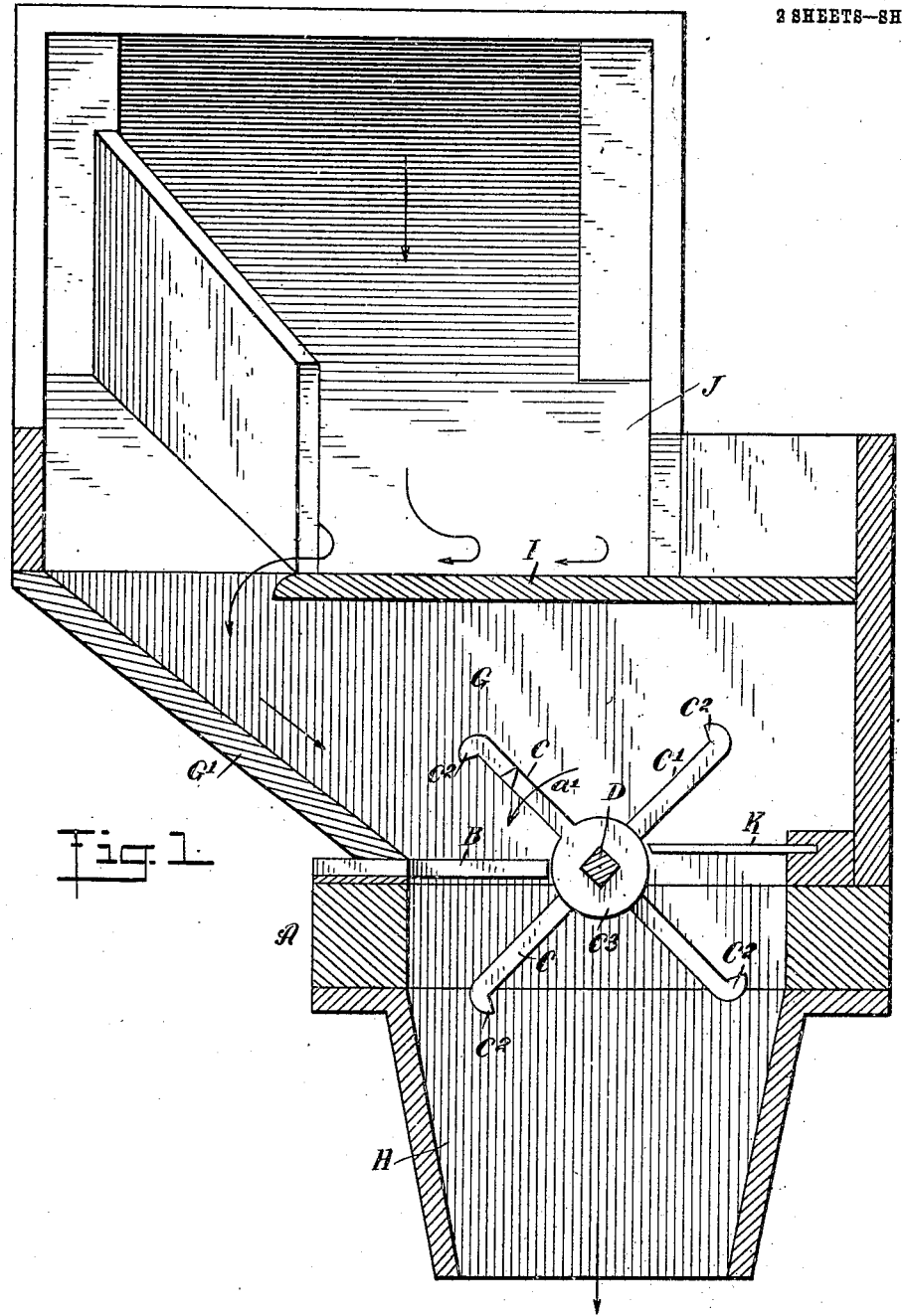
WITNESSES
INVENTOR
James H. Spencer
BY
ATTORNEYS

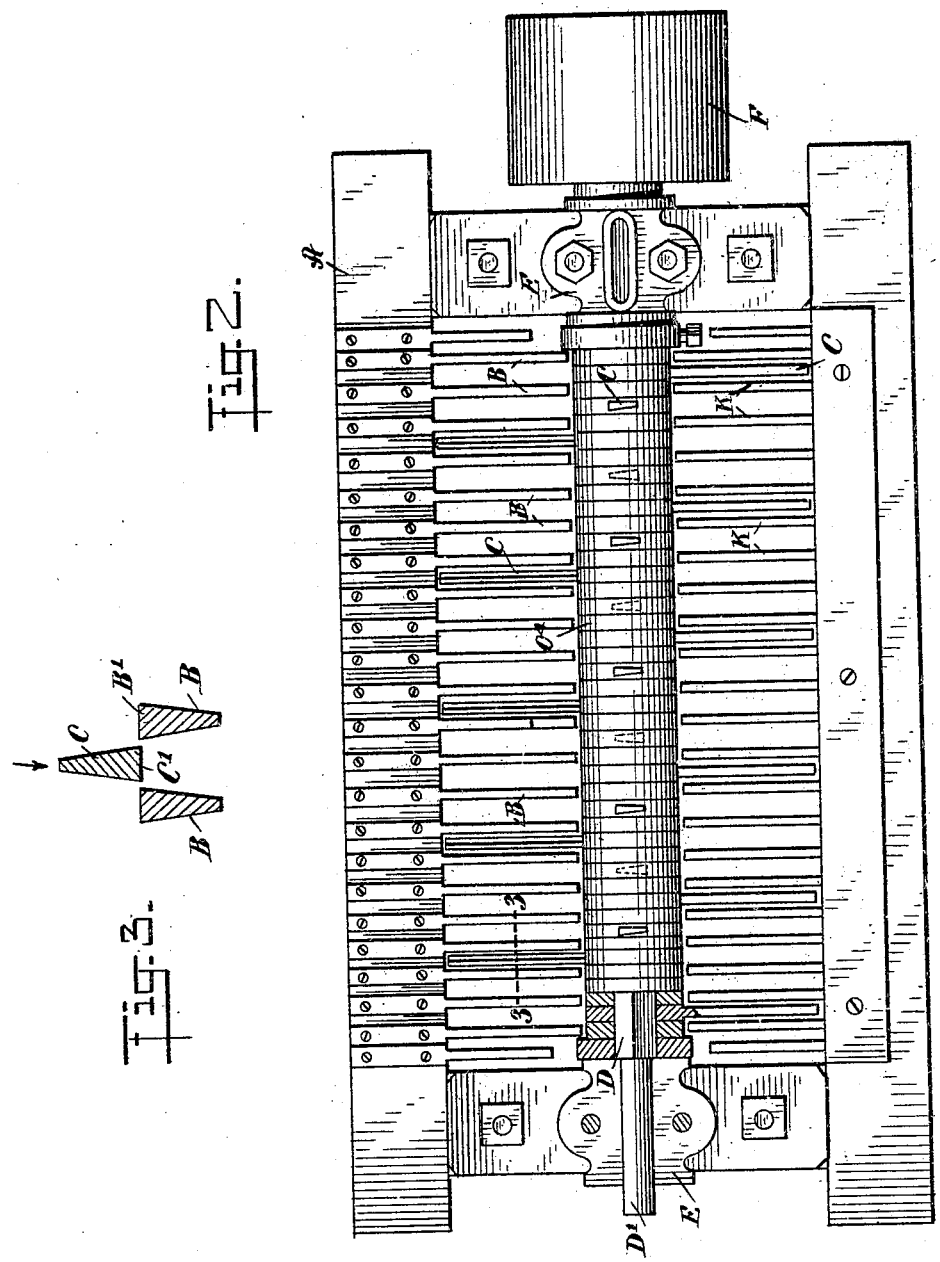

UNITED STATES PATENT OFFICE.

JAMES H. SPENCER, OF NEW YORK, N. Y., ASSIGNOR TO SPENCER IMPORTING & TRADING CO., OF NEW YORK, N. Y.

BREAKING OR GRANULATING MACHINE.

946,283. Specification of Letters Patent. Patented Jan. 11, 1910.

Application filed August 6, 1909. Serial No. 511,546.

*To all whom it may concern:*

Be it known that I, JAMES H. SPENCER, a citizen of the United States, and a resident of the city of New York, borough of Manhattan, in the county and State of New York, have invented a new and Improved Breaking or Granulating Machine, of which the following is a full, clear, and exact description.

The object of the invention is to provide a new and improved machine for breaking or granulating the meat of nuts and other material, without danger of bruising or crushing the same.

For the purpose mentioned, use is made of stationary spaced jaws, and movable jaws adapted to pass between adjacent fixed jaws, said fixed and movable jaws having tapering sides, and the wider faces of the fixed jaws being uppermost and the wider faces of the movable jaws being lowermost at their passage between the fixed jaws.

A practical embodiment of the invention is represented in the accompanying drawings forming a part of this specification, in which similar characters of reference indicate corresponding parts in all the views.

Figure 1 is a sectional side elevation of the improved machine; Fig. 2 is a plan view of the same, the feeding means being removed; and Fig. 3 is an enlarged cross section of a revoluble jaw and a pair of fixed jaws, the section being on the line 3—3 of Fig. 2.

The frame A is made rectangular, and on top of one of the side beams are secured the horizontally-disposed fixed jaws B, spaced apart and operating in conjunction with the jaws C of a revoluble breaker, having a shaft D journaled in suitable bearings E, arranged on the ends of the frame A, as plainly indicated in Fig. 2. The shaft D is provided at one end with a pulley F, connected by a belt with other machinery, for imparting a continuous rotary motion to the revoluble breaker, so that the jaws C thereof pass between adjacent fixed jaws B. The fixed jaws B as well as the movable jaws C have tapering sides, as plainly indicated in Fig. 3, and the fixed jaws B are so arranged that the wider faces B' are uppermost, and the movable jaws C are arranged so that their wider faces C' are lowermost at the time a jaw C passes between the corresponding fixed jaws B, as will be readily understood by reference to Fig. 3. The jaws B as well as the jaws C are disposed approximately radially relatively to the axis of the shaft D, and the outer wider faces C' of the movable jaws C terminate in angular offsets $C^2$, so that the nut meat or other article to be broken or granulated is readily taken hold of and broken between the faces C' and B' of the corresponding fixed and movable jaws.

In practice, the hubs $C^3$ of the jaws C have polygonal openings fitting the correspondingly-shaped shaft D, terminating at its ends in journals D' engaging the bearings E, and the jaws C are spaced one from the other by washers $C^4$, and the jaws are staggered so that the jaws C pass successively between the corresponding pair of fixed jaws B, as will be readily understood by reference to Fig. 2.

On top of the frame A is arranged a receiving chamber G, and to the under side of the frame A is secured a chute H for delivering the broken or granulated material to a suitable place for packaging the material. The receiving chamber G is provided with an inclined side G', leading at its lower end to the fixed jaws B, and the top of the chamber G is formed by a feed board I, over one side whereof the nut meat or other material to be broken or granulated is fed by an operator, so that the nut meat drops onto the inclined side G' and rolls down the same onto the fixed jaws B, to be engaged by the movable jaws C, with a view to break or granulate the material without crushing or bruising the same. A chute J leads to one end of the feed table I, for delivering the material onto the said feed table, it being, however, understood that the operator feeds the material over the inner edge of the table by hand, so that the material drops onto the side G', as previously explained.

A grate K is arranged on the side of the frame A, opposite the jaws B, to prevent the material from falling from the receiving chamber G into the chute H, at the rear of the revoluble breaker, it being understood that the jaws C on their return or upward movement pass between adjacent bars of the grate K.

By arranging the fixed and movable jaws B and C in the manner described, the nut meat is properly broken without danger of crushing or of bruising the same, it being understood that the broken parts can readily drop down between the next adjacent pairs of fixed jaws B, as the jaws C for said adjacent pairs of fixed jaws B are inactive at the time, as the jaws C are staggered and consequently sufficient time is given for the broken material to drop down between the adjacent fixed jaws.

It is understood that the nut meat or other article extending across the wide faces B′ of a pair of jaws B, is engaged by the wide face C′ of the jaw C, as the latter moves toward the fixed jaws B, and as the movable jaw C moves on downward the article is broken, and as the space between the tapering sides of the jaws B and C increases with the further downward movement of the jaws C, it is evident that the material is not liable to be crushed or bruised.

Having thus described my invention, I claim as new and desire to secure by Letters Patent:

1. A breaking or granulating machine, provided with a pair of fixed jaws, and a movable jaw adapted to pass between the said fixed jaws, the said fixed and movable jaws having tapering sides, the wider faces of the fixed jaws being uppermost and the wider face of the movable jaw being lowermost at the passage of the movable jaw between the fixed jaws.

2. A breaking or granulating machine, provided with a pair of horizontally disposed fixed jaws having tapering sides, the wider faces of the jaws being uppermost, and a revoluble jaw adapted to pass between the said fixed jaws and having tapering sides, the wider face of the revoluble jaw being lowermost at the passage between the said fixed jaws.

3. A breaking or granulating machine, comprising fixed jaws in the form of spaced tongues disposed horizontally and having tapering sides forming a wide upper face, and a revoluble breaker having breaking jaws disposed approximately radially and staggered on the hub of the breaker, each breaking jaw being adapted to pass between a pair of fixed jaws, and each breaking jaw having tapering sides and a flat wide breaking face which is lowermost at the passage of the breaking jaw between a pair of fixed jaws.

4. A breaking or granulating machine, comprising fixed jaws in the form of spaced tongues disposed horizontally and having tapering sides forming a wide upper face, and a revoluble breaker having breaking jaws disposed approximately radially and staggered on the hub of the breaker, each breaking jaw being adapted to pass between a pair of fixed jaws and each breaking jaw having tapering sides and a flat wide breaking face which is lowermost at the passage of the breaking jaw between a pair of fixed jaws, each breaking jaw terminating at its wider face in an angular offset.

5. A breaking or granulating machine, comprising fixed jaws in the form of spaced tongues disposed horizontally and having tapering sides forming a wide upper face, a revoluble breaker having a polygonal shaft terminating in journals mounted to turn, and radial breaking jaws having polygonal hubs fitting the said shaft, the jaws being spaced apart and staggered on the said shaft to pass successively between adjacent fixed jaws, each breaking jaw having tapering sides and a flat wide breaking face which is lowermost at the passage of the breaking jaw between the corresponding fixed jaws.

In testimony whereof I have signed my name to this specification in the presence of two subscribing witnesses.

JAMES H. SPENCER.

Witnesses:
WM. A. PENDLETON,
CHAS. P. HEITKAMP.